(12) United States Patent
Nakajima (10) Patent No.: US 8,164,664 B2
(45) Date of Patent: Apr. 24, 2012

(54) SOLID-STATE IMAGING APPARATUS HAVING A REDUCED NUMBER OF WIRINGS WITHIN A PIXEL SECTION

(75) Inventor: Shinichi Nakajima, Tokyo (JP)

(73) Assignee: Olympus Corporation, Tokyo (JP)

( * ) Notice: Subject to any disclaimer, the term of this patent is extended or adjusted under 35 U.S.C. 154(b) by 448 days.

(21) Appl. No.: 12/243,352

(22) Filed: Oct. 1, 2008

(65) Prior Publication Data

US 2009/0086070 A1    Apr. 2, 2009

(30) Foreign Application Priority Data

Oct. 2, 2007   (JP) ................................ 2007-258282

(51) Int. Cl.
 *H04N 3/14* (2006.01)
 *H04N 5/335* (2011.01)
(52) U.S. Cl. ..................................... 348/302
(58) Field of Classification Search ................ 348/302, 348/303, 304, 308, 311, 312
See application file for complete search history.

(56) References Cited

U.S. PATENT DOCUMENTS

| | | | | |
|---|---|---|---|---|
| 4,528,595 A * | 7/1985 | Eouzan | ......................... | 348/305 |
| 4,587,562 A * | 5/1986 | Imai et al. | ...................... | 348/307 |
| 4,658,287 A * | 4/1987 | Chen | ............................ | 348/281 |
| 4,797,562 A * | 1/1989 | Dietrich | ........................ | 348/301 |
| 5,144,447 A * | 9/1992 | Akimoto et al. | .............. | 348/301 |
| 6,035,013 A * | 3/2000 | Orava et al. | ...................... | 378/37 |
| 6,480,227 B1 * | 11/2002 | Yoneyama | ..................... | 348/308 |
| 7,710,477 B2 * | 5/2010 | Nam et al. | ..................... | 348/275 |
| 2005/0259169 A1 * | 11/2005 | Ito et al. | .......................... | 348/308 |
| 2007/0273780 A9 * | 11/2007 | Shinotsuka | ................... | 348/308 |
| 2008/0049133 A1 * | 2/2008 | Bock | .............................. | 348/317 |
| 2010/0085456 A1 * | 4/2010 | Ito et al. | ........................ | 348/302 |

FOREIGN PATENT DOCUMENTS

JP   11-261896 A   9/1999

* cited by examiner

*Primary Examiner* — Nicholas Giles
(74) *Attorney, Agent, or Firm* — Westerman, Hattori, Daniels & Adrian, LLP

(57) ABSTRACT

A solid-state imaging apparatus including: a pixel section having a plurality of pixels arranged into a two-dimensional array, each pixel having a photoelectric conversion means, a memory means for storing a photoelectric conversion signal of the photoelectric conversion means, a transfer means for transferring the photoelectric conversion signal to the memory means, a reset means for resetting the memory means, a discharge means for discharging the photoelectric conversion signal accumulated at the photoelectric conversion signal, and a read means for reading the photoelectric conversion signal of the memory means; a vertical circuit for controlling an operation of the pixels in the pixel section, the vertical circuit having an alternate disposition in the vertical direction of a discharge control signal line connected to the discharge means of vertically adjacent ones of the pixels for controlling the discharge means and a transfer control signal line connected to the transfer means of vertically adjacent ones of the pixels for controlling the transfer means; and a concurrent control means for controlling the vertical circuit so as to cause a concurrent operation respectively of the discharge means and the transfer means.

4 Claims, 7 Drawing Sheets

| Gr | R  | Gr | R  |
|----|----|----|----|
| B  | Gb | B  | Gb |
| Gr | R  | Gr | R  |
| B  | Gb | B  | Gb |

SOLID-STATE IMAGING APPARATUS HAVING A REDUCED NUMBER OF WIRINGS WITHIN A PIXEL SECTION

This application claims benefit of Japanese Patent Application No. 2007-258282 filed in Japan on Oct. 2, 2007, the contents of which are incorporated by this reference.

BACKGROUND OF THE INVENTION

The present invention relates to solid-state imaging apparatus for use for example in digital cameras, and more particularly relates to solid-state imaging apparatus having a concurrent shutter function where it is made possible to reduce the number of wirings within a pixel section.

Figure 1:
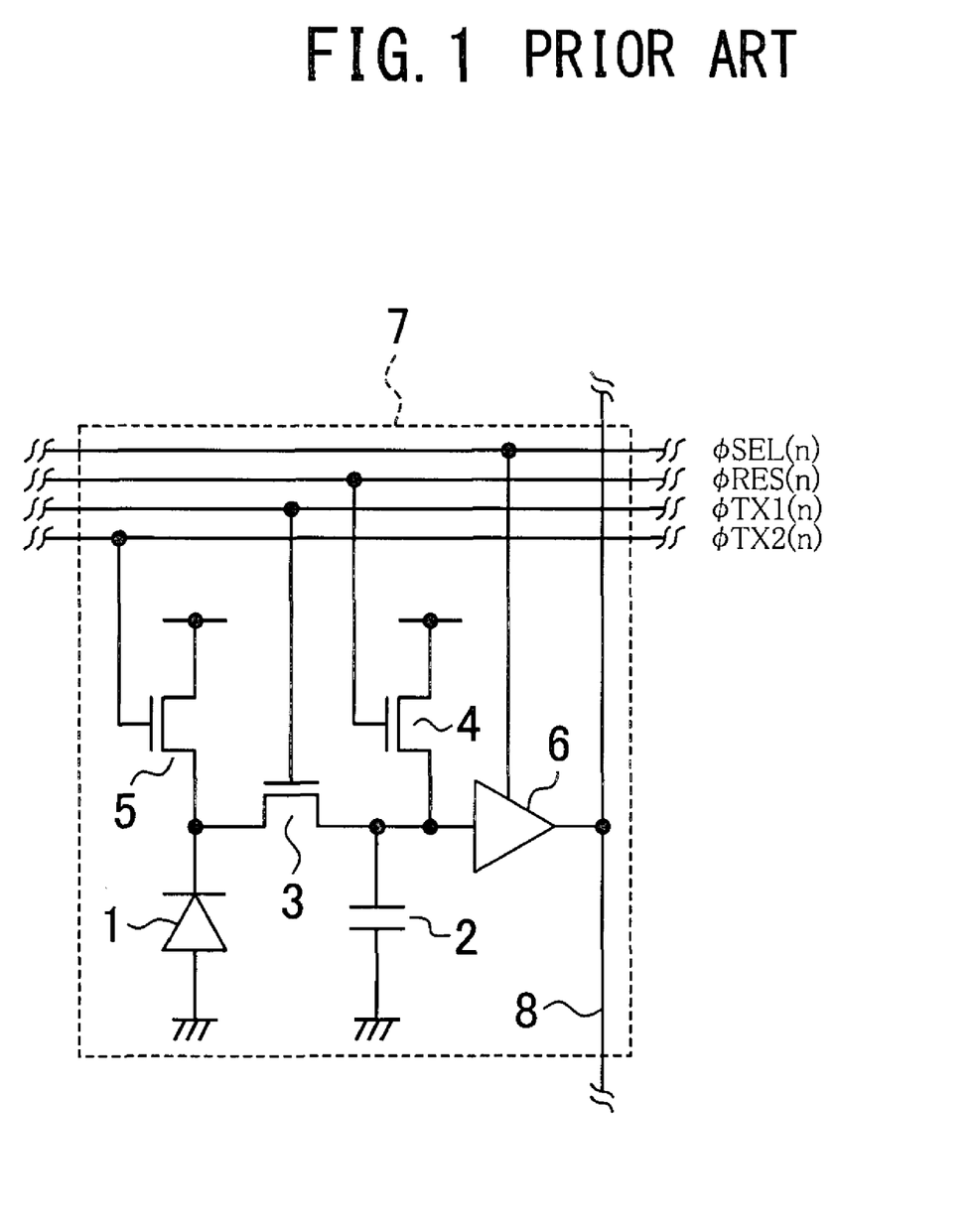
FIG. 1 is a circuit diagram showing construction of a pixel for use in prior-art solid-state imaging apparatus having a concurrent shutter function.

The construction as shown in FIG. 1 has been disclosed for example in Japanese Patent Application Laid-Open hei-11-261896 as a pixel of the pixel section to be used in the solid-state imaging apparatus having a concurrent shutter (referred to also as a global shutter) function. FIG. 1 includes: a photoelectric conversion means 1 such as photodiode for receiving light for a predetermined time to effect its photoelectric conversion by accumulating photoelectric charges; a memory means 2 for retaining photoelectric charges of the photoelectric conversion means 1; a transfer means 3 for transferring photoelectric charges of the photoelectric conversion means 1 to the memory means 2; a reset means 4 for resetting the memory means 2 to a power supply potential; a discharge means 5 for resetting the photoelectric conversion means 1 to a power supply potential; and a read means 6 for reading the electric charges of the memory means 2. A plurality of unit pixels 7 each constituted of these means are two-dimensionally arranged to form a pixel section. What is denoted by numeral 8 is a vertical signal line for outputting a signal read out by the read means 6.

Also referring to FIG. 1, $\phi$ TX1(n), $\phi$ RES(n), $\phi$ TX2(n), and $\phi$ SEL(n) are a transfer control signal, reset control signal, discharge control signal, and read control signal, respectively, for controlling ON and OFF of the transfer means 3, the reset means 4, the discharge means 5, and the read means 6. It should be noted that the suffix (n) of $\phi$ TX1(n), $\phi$ RES(n), $\phi$ TX2(n), and $\phi$ SEL(n) represents the location of row, and these control signals are respectively outputted to each row of the pixel section from a vertical circuit to be described in the following.

Figure 2:
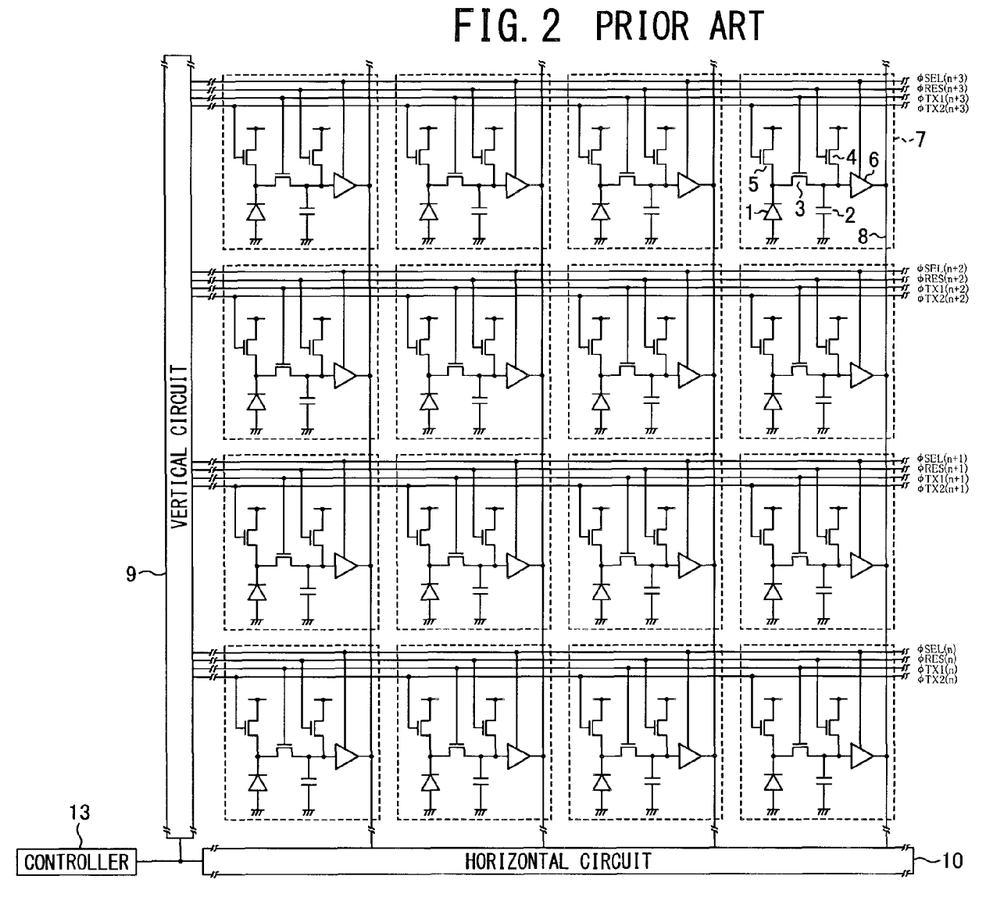
FIG. 2 is a circuit diagram showing an example of construction of the prior-art solid-state imaging apparatus having a concurrent shutter function using the pixel shown in FIG. 1.

FIG. 2 shows an example of construction of the prior-art solid-state imaging apparatus having a concurrent shutter function where pixels of the construction shown in FIG. 1 are used. In the pixel section of the illustrated example, only a portion consisting of a 4×4 array of 16 pixels is shown. FIG. 2 includes: a vertical circuit 9; a horizontal circuit 10 for selecting a vertical signal line 8 so as to output the signal of pixel associated with a pixel column which is connected to that vertical signal line; and a controller 13 for controlling operation of the vertical circuit 9 and the horizontal circuit 10.

Figure 3:
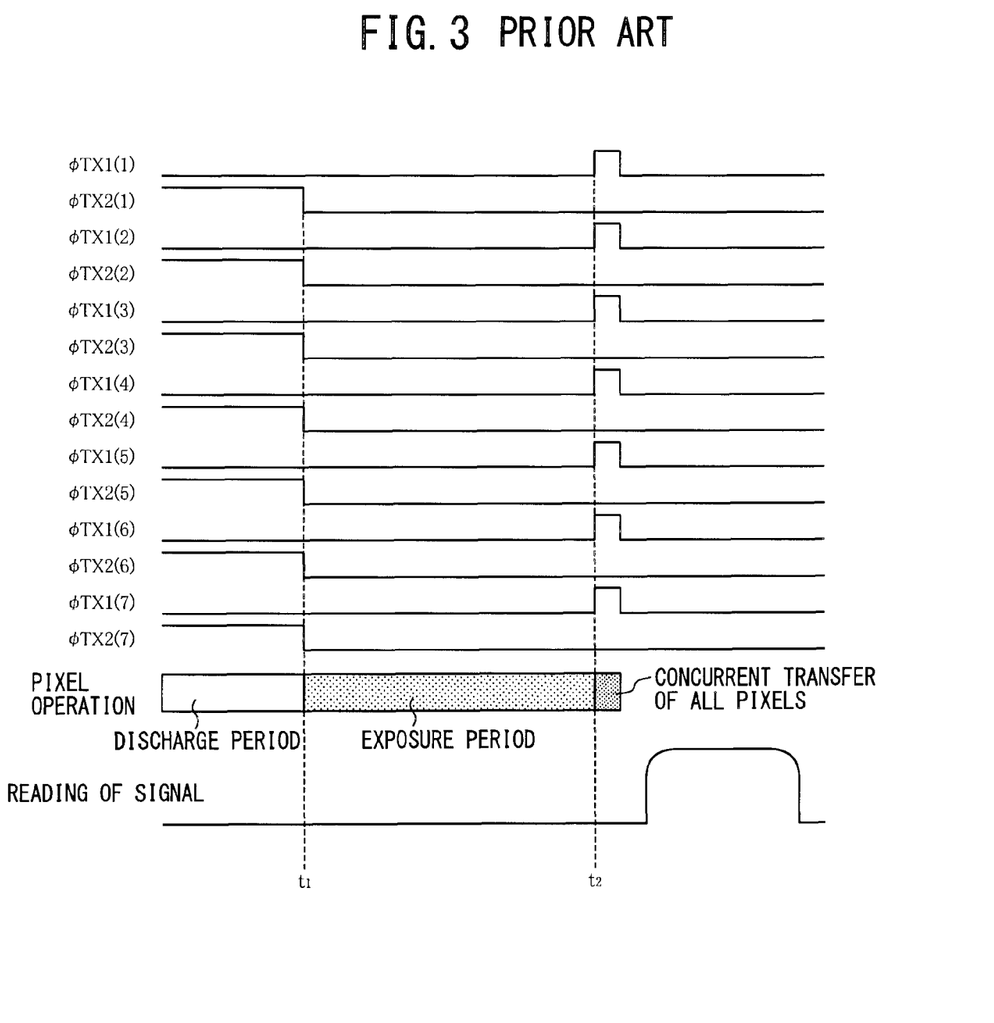
FIG. 3 is a timing chart for explaining operation of the solid-state imaging apparatus shown in FIG. 2.

An operation of the pixel section of the solid-state imaging apparatus shown in FIG. 2 will be described below with reference to a timing chart shown in FIG. 3. In the timing chart shown in FIG. 3, operation timing is shown with assuming a pixel section having seven pixel rows. As shown in FIG. 3, by concurrently driving the discharge control signal $\phi$ TX2(n) of all pixels to H level, a concurrent discharge operation of all pixels is started by the discharge means 5. At a point in time $t_1$ after passage of a predetermined time, the discharge control signal $\phi$ TX2(n) is brought to L level concurrently of all pixels. A concurrent discharge/reset operation of all pixels is thus completed by the discharge means 5 so that an exposure of all pixels is started.

After passage of a predetermined exposure time, the transfer means 3 is turned ON concurrently of all pixels by the transfer control signal $\phi$ TX1(n) at a timing of concurrent transfer of all pixels so that photoelectric charges accumulated at the photoelectric conversion means 1 are concurrently transferred to the memory means 2 (time $t_2$). In other words, the exposure is ended. Here in the timing chart shown in FIG. 3, the period from time $t_1$ to time $t_2$ constitutes an actual exposure period. When the exposure is ended, a reading of signal levels is then started sequentially beginning from the first row with using the read means 6 by the read control signal $\phi$ SEL(n).

SUMMARY OF THE INVENTION

In a first aspect of the invention, there is provided a solid-state imaging apparatus including: a pixel section having a plurality of pixels arranged into a two-dimensional array, each pixel having a photoelectric conversion means, a memory means for storing a photoelectric conversion signal of the photoelectric conversion means, a transfer means for transferring the photoelectric conversion signal to the memory means, a reset means for resetting the memory means, a discharge means for discharging the photoelectric conversion signal accumulated at the photoelectric conversion means, and a read means for reading the photoelectric conversion signal of the memory means; a vertical circuit for controlling an operation of the pixels in the pixel section, the vertical circuit having an alternate disposition in the vertical direction of a discharge control signal line connected to the discharge means of vertically adjacent ones of the pixels for controlling the discharge means and a transfer control signal line connected to the transfer means of vertically adjacent ones of the pixels for controlling the transfer means; and a concurrent control means for controlling the vertical circuit so as to cause a concurrent operation respectively of the discharge means and the transfer means.

In a second aspect of the invention, the vertical circuit in the solid-state imaging apparatus according to the first aspect is composed of a first and a second vertical circuits disposed on opposite sides of the pixel section that intervenes, the first vertical circuit including the discharge control signal line and the transfer control signal line, and the second vertical circuit including control signal lines for controlling operation of the pixels but the discharge control signal line and the transfer control signal line.

In a third aspect of the invention, the pixel section in the solid-state imaging apparatus according to the first aspect has on its light receiving surface a plurality of types of color filters having different spectral transmittances for an incident light arranged correspondingly to the arrangement of the discharge control line and the transfer control signal line.

In a fourth aspect of the invention, the color filters in the solid-state imaging apparatus according to the third aspect are arranged in a Bayer array.

DESCRIPTION OF THE PREFERRED EMBODIMENTS

Some embodiments of the solid-state imaging apparatus according to the invention will be described below with reference to the drawings.

Embodiment 1

Figure 4:
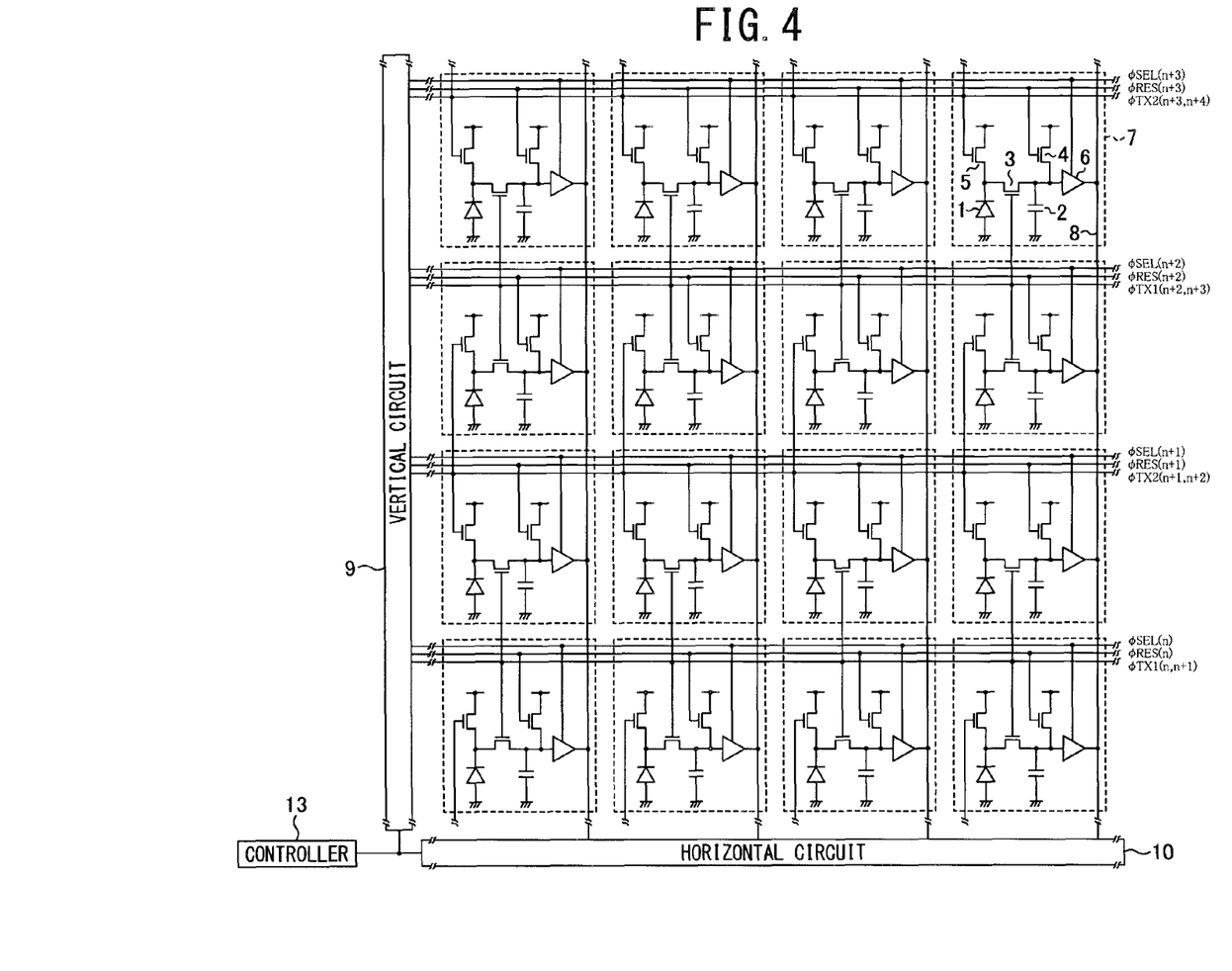
FIG. 4 is a circuit diagram showing construction of a first embodiment of the solid-state imaging apparatus according to the invention.

A first embodiment of the solid-state imaging apparatus according to the invention will now be described. FIG. 4 is a schematic circuit block diagram of the solid-state imaging apparatus according to the first embodiment, where those identical or corresponding components as those in the prior-art example shown in FIG. 2 are denoted by identical reference numerals. FIG. 4 includes: a photoelectric conversion means 1 such as photodiode for receiving light for a predetermined time to effect its photoelectric conversion by accumulating photoelectric charges; a memory means 2 for retaining photoelectric charges of the photoelectric conversion means 1; a transfer means 3 for transferring photoelectric charges of the photoelectric conversion means 1 to the memory means 2; a reset means 4 for resetting the memory means 2 to a power supply potential; a discharge means 5 for resetting the photoelectric conversion means 1 to a power supply potential; and a read means 6 for reading the electric charges of the memory means 2. What is denoted by numeral 7 is a unit pixel formed of these means, a plurality of which are two-dimensionally arranged to form a pixel section, the illustrated example showing only a portion consisting of a 4×4 array of 16 pixels. Numeral 8 in FIG. 1 is a vertical signal line for outputting a signal read out by the read means 6.

Numeral 9 in FIG. 4 is a vertical circuit, where reset control signal lines for applying reset control signals ϕ RES(n), ϕ RES(n+1), . . . to control ON and OFF of the reset means 4, and read control signal lines for applying read control signals ϕ SEL(n), ϕ SEL(n+1), . . . to control ON and OFF of the read means 6 of each unit pixel 7 are respectively connected row by row of the pixel section to the vertical circuit 9. Further, connected alternately at every row to the vertical circuit 9 are: transfer control signal lines for applying transfer control signals ϕ TX1(n, n+1), ϕ TX1(n+2, n+3), . . . to control ON and OFF of the transfer means 3 of each unit pixel 7 of every two rows of the pixel section in common, and discharge control signal lines for applying discharge control signals ϕ TX2(n+1, n+2), ϕ TX2(n+3, n+4), . . . to control ON and OFF of the discharge means 5 of each unit pixel 7 also of every two rows of the pixel section in common. It should be noted that the suffixes (n), (n+1), . . . of ϕ RES(n), ϕ RES(n+1), . . . , ϕ SEL(n), ϕ SEL(n+1), . . . , ϕ TX1(n, n+1), ϕ TX1(n+2, n+3), . . . , and ϕ TX2(n+1, n+2), ϕ TX2(n+3, n+4), . . . represent the location of rows, and each control signal line in FIG. 4 is denoted by each corresponding control signal. Also referring to FIG. 4, numeral 10 is a horizontal circuit which is to select a vertical signal line 8 so as to output signals of the pixels associated with the pixel column to which the vertical signal line is connected, and 13 is a controller for controlling operation of the vertical circuit 9 and the horizontal circuit 10.

Here, in the present embodiment, disposed at every other row are the transfer control signal lines ϕ TX1(n, n+1), ϕ TX1(n+2, n+3), . . . each connected in common to the transfer means of each pixel of an odd-number row of the pixel section formed of the plurality of pixels and to the transfer means of each pixel of an even-number row adjacent to the pixel row of the odd-number row in a sub-scanning direction (upward in the vertical direction). Also disposed at every other row are the discharge control signal lines ϕ TX2(n+1, n+2), ϕ TX2(n+3, n+4), . . . each connected in common to the discharge means of each pixel of an even-number row of the pixel section formed of the plurality of pixels and to the discharge means of each pixel of an odd-number row adjacent to the pixel row of the even-number row in the sub-scanning direction (upward in the vertical direction).

Figure 5:
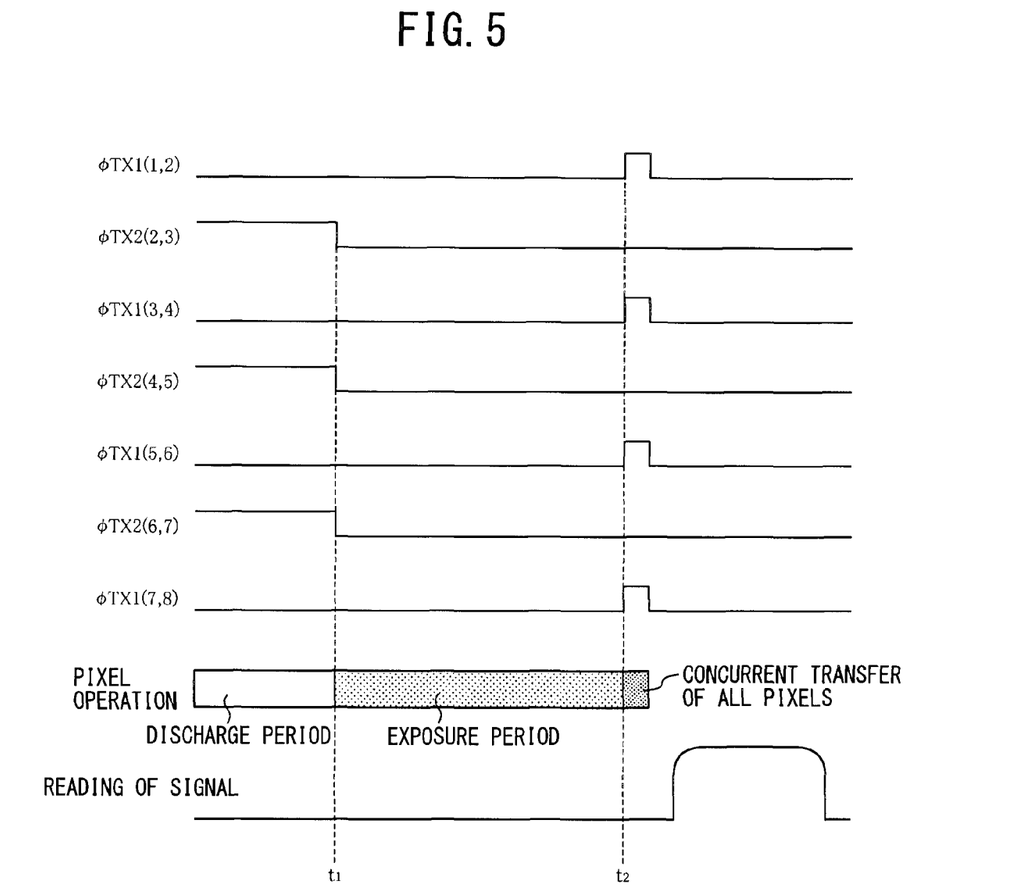
FIG. 5 is a timing chart for explaining operation of the first embodiment shown in FIG. 4.

An operation of the solid-state imaging apparatus according to the first embodiment shown in FIG. 4 will now be described with reference to a timing chart shown in FIG. 5. In the timing chart shown in FIG. 5, the operation timing is shown with assuming a pixel section having eight pixel rows. As shown in FIG. 5, the discharge control signals ϕ TX2(2, 3), ϕ TX2(4, 5), ϕ TX2(6, 7) are concurrently driven to H level so that a concurrent reset operation of all pixels by the discharge means 5 is started. After passage of a predetermined time, the discharge control signals ϕ TX2(2, 3), ϕ TX2(4, 5), ϕ TX2(6, 7) are concurrently brought to L level. A concurrent reset operation of all pixels by the discharge means 5 is thereby completed, and an exposure of all pixels is started (time $t_1$).

After passage of a predetermined exposure time, the transfer control signals ϕ TX1(1, 2), ϕ TX1(3, 4), ϕ TX1(5, 6), ϕ TX1(7, 8) are concurrently driven to H level at a timing $t_2$ for a concurrent transfer of all pixels. The photoelectric charges accumulated at the photoelectric conversion means 1 of all pixels are thus concurrently transferred to the memory means 2 by the transfer means 3 so that the exposure is ended. When the exposure/transfer operation is completed, reading of signals is started and the signals are outputted onto the vertical signal line 8 with using the read means 6 based on the read control signals ϕ SEL(n), ϕ SEL(n+1), . . . in a sequential order starting from the first row.

In the present embodiment, the reset control signal line for resetting the memory means 2 and the read control signal line for reading signal of the memory means 2 are provided at each row. On the other hand, the discharge control signal line connected in common to discharge means 5 of vertically adjacent pixels for controlling the discharge means 5, and the transfer control signal line connected in common to transfer means 3 of vertically adjacent pixels for controlling the transfer means 3 are alternately disposed in the vertical direction. As a result, three control signal lines are to be disposed at each row of the pixel section so that the number of wirings can be reduced. Thus, the structure of the pixel section is simplified, and at the same time its aperture rate can be improved.

Embodiment 2

Figure 6:
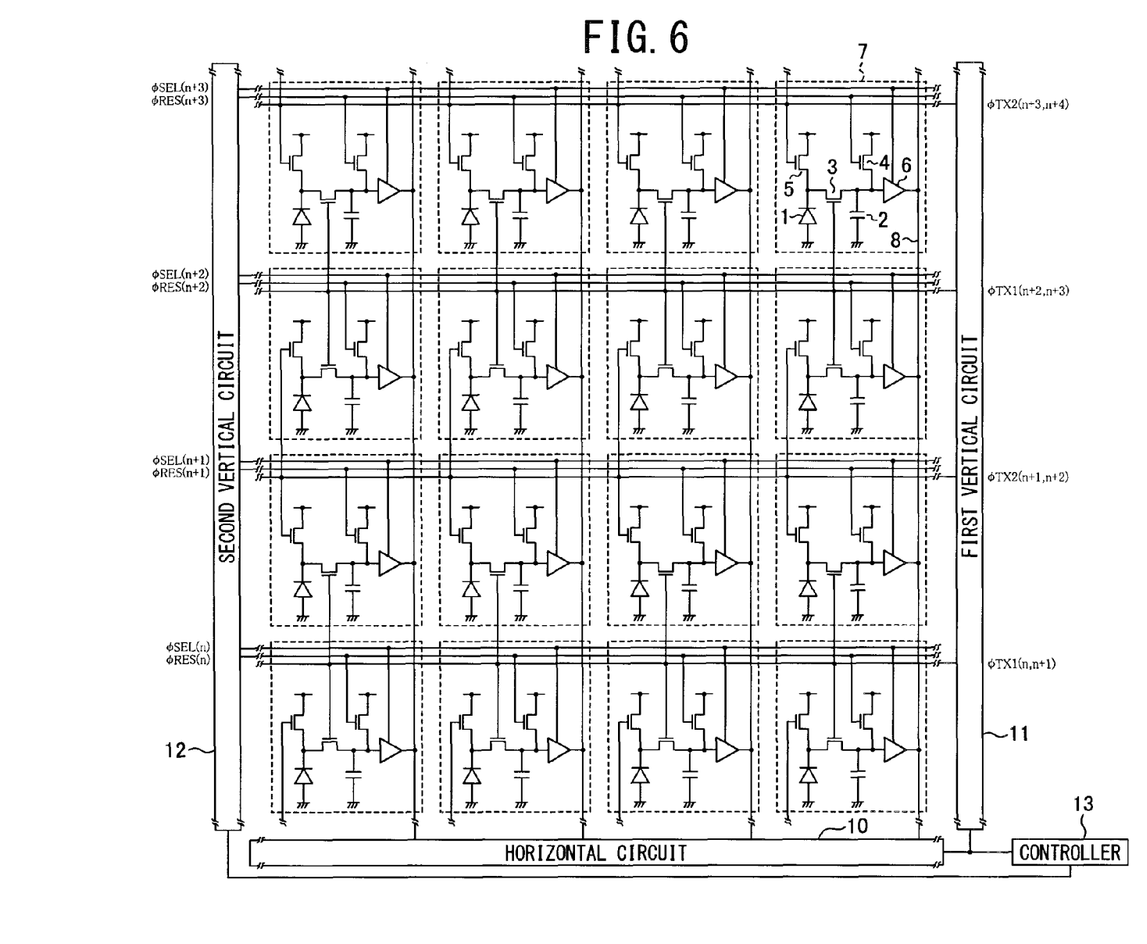
FIG. 6 is a circuit diagram showing construction of the solid-state imaging apparatus according to a second embodiment.

The construction will now be described by way of FIG. 6 of the solid-state imaging apparatus according to a second embodiment. The construction of the solid-state imaging apparatus according to the second embodiment is different from the construction of the solid-state imaging apparatus according to the first embodiment as follows. Specifically in the first embodiment, the vertical circuit 9 is provided on one side of the pixel section where unit pixels are two-dimensionally arrayed so that the reset control signal line φ RES(n), φ RES(n+1), . . . , and read control signal line φ SEL(n), φ SEL(n+1), . . . are connected both at each row to the vertical circuit 9, and the transfer control signal line φ TX1(n, n+1), φ TX1(n+2, n+3), . . . and the discharge control signal line φ TX2(n+1, n+2), φ TX2(n+3, n+4), . . . are connected alternately at each row. In the second embodiment, on the other hand, a first vertical circuit 11 on one side and a second vertical circuit 12 on the other are provided on the sides of an intervening pixel section where unit pixels are two-dimensionally arrayed. The reset control signal line φ RES(n), φ RES(n+1), . . . , and read control signal line φ SEL(n), φ SEL(n+1), . . . are then connected to the second vertical circuit 12, while the transfer control signal line φ TX1(n, n+1), φ TX1(n+2, n+3), . . . , and the discharge control signal line φ TX2(n+1, n+2), φ TX2(n+3, n+4), . . . are connected to the first vertical circuit 11.

Here, the reset control signal line φ RES(n), φ RES(n+1), . . . , and read control signal line φ SEL(n), φ SEL(n+1), are the control signals for a sequential scan of the pixel section in sub-scanning direction (upward in the vertical direction), while the transfer control signal line φ TX1(n, n+1), φ TX1(n+2, n+3), . . . , and the discharge control signal line φ TX2(n+1, n+2), φ TX2(n+3, n+4), . . . are the control signals which are to concurrently control all pixels of the pixel section. A scanning circuit or a decoder circuit for example is generally used in order to control the control signals for effecting sequential scan, while, on the other hand, a driver circuit for concurrently driving all pixels for example is necessary to concurrently control all pixels.

In the present embodiment, the signals for concurrently controlling all pixels and the signals for controlling sequential scan are assigned to the first vertical circuit and the second vertical circuit, respectively. As a result, it suffices to have the scanning circuit or decoder circuit for effecting sequential scan only on the vertical circuit on one side, and such as the driver circuit and power supply for concurrently driving all pixels only on the other. Thus, in addition to the advantages of the first embodiment, the second embodiment has an advantage of simplified a layout of the vertical circuit and is more preferable.

Embodiment 3

Figure 7:
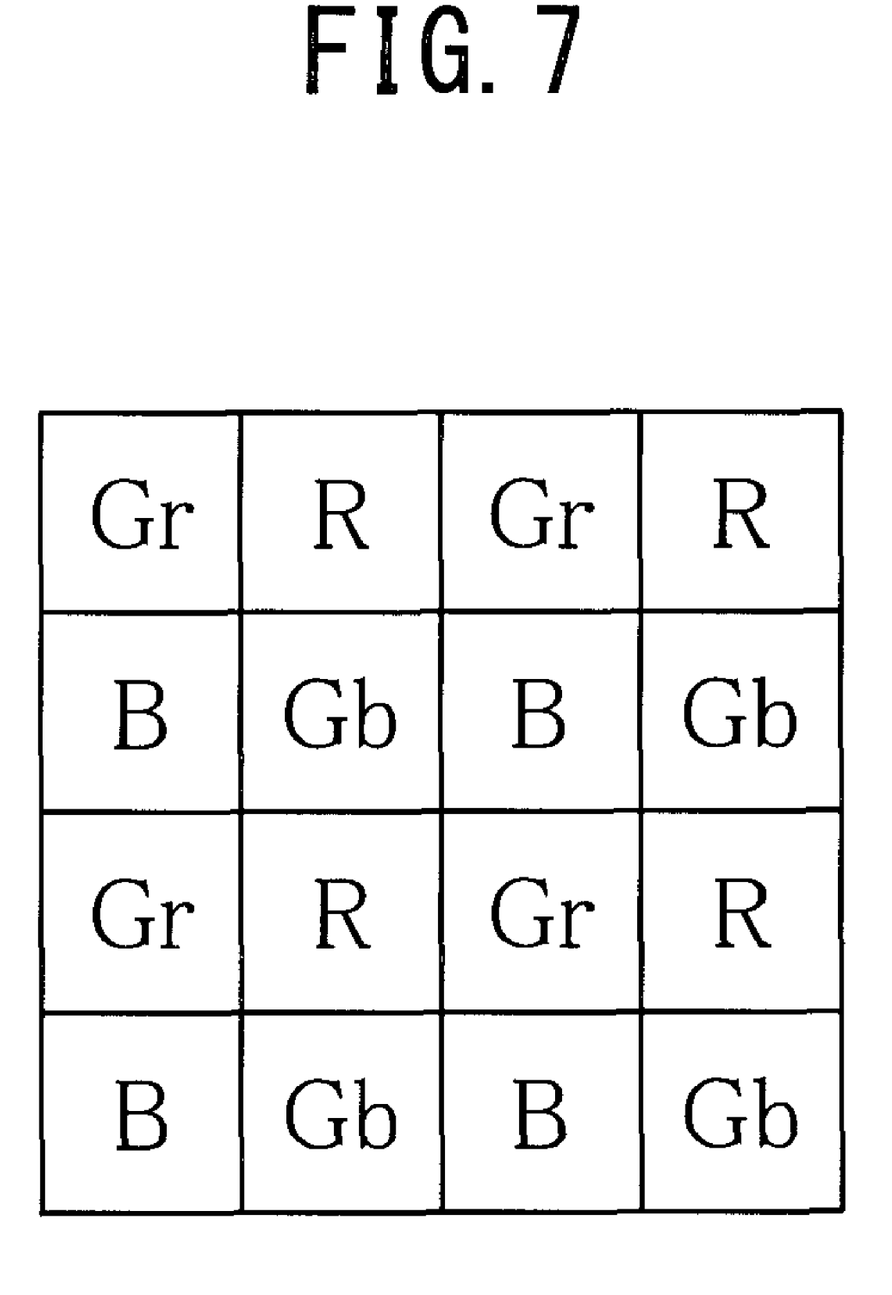
FIG. 7 shows the construction of color filters for use in the solid-state imaging apparatus according to the third embodiment.

A third embodiment will now be described. The fundamental construction of the solid-state imaging apparatus according to this embodiment is identical to the first or second embodiment. The present embodiment is achieved by disposing a color filter array having the construction shown in FIG. 7 on the pixel section shown in the first or second embodiment. Referring to FIG. 7, Gr and Gb indicate green filters, and B and R indicate a blue filter and a red filter, respectively. The array of such color filters constitutes the so-called Bayer pattern where a periodic repetition of color filters in the sub-scanning direction (vertical direction) is to repeat the same pattern in every two rows.

In the pixel section of the first or second embodiment, the reset control signal line and the read control signal line are disposed at each row, and the transfer control signal line and the discharge control signal line are disposed alternately on each row so that each of the signal lines is repeated in every two rows. The period of such repetitive structure matches the period of repetition of the arrangement of color filters in the above described color filter array to be disposed over the pixel section. In the third embodiment where a color filter array having the above described color filter arrangement is disposed on the pixel section shown in the first or second embodiment, such as a periodic pattern for example due to a sensitivity difference among the same color filters do not occur so that an excellent image can be obtained without requiring a correction, etc.

It should be noted that the above embodiments have been shown as those where the transfer control signal lines are disposed at every odd-number row of the pixel section so as to be connected in common to the transfer means of each pixel of an odd-number row of the pixel section and to the transfer means of each pixel of an even-number row adjacent to the odd-number row in the sub-scanning direction, while the discharge control signal lines, on the other hand, are disposed at every even-number row of the pixel section so as to be connected in common to the discharge means of each pixel of an even-number row of the pixel section and to the discharge means of each pixel of an odd-number row adjacent to the even-number row in the sub-scanning direction. As a modification of these, it is naturally also possible to dispose in an interchanged manner the transfer control signal lines at each even-number row, and the discharge control signal lines at each odd-number row. Further, while the disposition where the first vertical circuit is disposed on the right side of the pixel section and the second vertical circuit on the left has been shown in the second embodiment, it is naturally also possible to interchange the disposition of left and right.

According to the invention as has been described by way of the above embodiments, since the discharge control signal line and the transfer control signal line are alternately disposed in the vertical direction, it is possible to reduce the number of wirings in the pixel section as compared to the prior-art example where the two control signal lines are disposed row by row so that a solid-state imaging apparatus with an improved aperture rate can be achieved.

What is claimed is:
1. A solid-state imaging apparatus comprising:
a pixel section having a plurality of pixels arranged into a two-dimensional array, each pixel having a photoelectric conversion means, a memory means for storing a photoelectric conversion signal of the photoelectric conversion means, a transfer means for transferring said photoelectric conversion signal to said memory means, a reset means for resetting said memory means, a discharge means for discharging the photoelectric conversion signal accumulated at said photoelectric conversion means, and a read means for reading the photoelectric conversion signal of said memory means;
a vertical circuit for controlling an operation of the pixels in said pixel section, said vertical circuit having an alternate disposition in the vertical direction of a discharge control signal line connected to the discharge means of first and second vertically adjacent ones of said pixels for controlling the discharge means and a transfer control signal line connected to the transfer means of said second and a third vertically adjacent ones of said pixels for controlling the transfer means; and
a concurrent controller for controlling said vertical circuit so as to cause a concurrent operation respectively of said discharge means and said transfer means.
2. The solid-state imaging apparatus according to claim 1, wherein said vertical circuit comprises a first and a second vertical circuits disposed on opposite sides of said pixel section, said first vertical circuit includes said discharge control signal line and said transfer control signal line, and said second vertical circuit includes control signal lines for con- trolling operation of said pixels but does not include said discharge control signal line and said transfer control signal line.

3. The solid-state imaging apparatus according to claim 1, wherein said pixel section includes a light receiving surface on which a plurality of types of color filters having different spectral transmittances for an incident light are arranged correspondingly to the arrangement of said discharge control line and said transfer control signal line.

4. The solid-state imaging apparatus according to claim 3, wherein said color filters are arranged in a Bayer array.

* * * * *